: 3,019,215
Patented Jan. 30, 1962

3,019,215
PRODUCTION OF TELOMERS FROM ETHYLENICALLY UNSATURATED COMPOUNDS
Hugo Kroeper, Heidelberg, Hans-Martin Weitz, Ludwigshafen (Rhine), and Rolf Platz, Mannheim, Germany, assignors to Badische Anilin- & Soda-Fabrik Aktiengesellschaft, Ludwigshafen (Rhine), Germany
No Drawing. Filed May 10, 1956, Ser. No. 583,939
Claims priority, application Germany May 14, 1955
16 Claims. (Cl. 260—94.9)

This invention relates to the production of telomers from ethylenically-unsaturated compounds.

We have found that valuable telomers are obtained by reacting ethylenically-unsaturated compounds in the presence of hydrocarbon compounds of metals of the 4th main group (germanium, tin and lead) of the periodic system of elements or the elements of 5th main group (nitrogen, phosphorous, arsenic, antimony and bismuth), and organic halogen compounds. Instead of a mixture of a hydrocarbon compound and an organic halogen compound, it is also possible to use the halogen substitution or addition compounds of the hydrocarbon compounds, if desired in the presence of organic halogen compounds.

As ethylenically-unsaturated compounds there come into question mono-olefines, such as ethylene, propylene, butylene, isobutylene or mixtures of the same, diolefines, as for example butadiene or isoprene, and also vinyl compounds, such as styrene and its alkyl and halogen derivatives, vinyl chloride, vinylidene chloride, vinyl ethers, vinyl esters, acrylic acid esters, methacrylic acid esters or acrylonitrile, and finally terafluorethylene, trifluorchlorethylene or allyl alcohol as well as mixtures of these compounds.

As hydrocarbon compounds there may be used for exampe the alkyl and aryl compounds of the metals of the 4th main group of the general formula $MeR_2$, $Me_2R_6$ and $MeR_4$. In this formula Me is in particular germanium, tin or lead and R is an organic, in particular a saturated aliphatic, cylcloaliphatic or an aromatic radical. The most preferred cycloaliphatic and aromatic radicals are monocyclic radicals, such as cyclohexyl and aryl. They may be substituted, for instance by alkyl-, cycloalkyl- or aryl radicals. R may, however, be an unsaturated radical, especially having an ethylenical unsaturation, such as the vinyl group. The chains of the aliphatic radicals used are preferably short. Chains with one to four carbon atoms are most useful. But also aliphatic radicals with higher molecular weight, such as octyl, dodecyl or hexadecyl radicals can be suitable. The organic radical can be partly replaced by hydrogen, halogen, hydroxyl or other groups. Especially siutable compounds of this kind are for example tin tetraethyl, diethyl tin, hexaphenyldistannane or tetraethyl lead. The corresponding hydrocarbon compounds of the elements of the 5th main group can also be used, namely of nitrogen, phosphorus, arsenic, antimony or bismuth, as for example triphenylarsine, tribenzylphosphine, tri-normal-butylphosphine, triethyl bismuth, or general compounds of the formula $MeR_3$ or $MeR_5$ in which Me is an element of the 5th main group and R is the organic radical. There are also suitable for example the addition or substitution products of the alkyl or aryl compounds of inorganic or organic compounds. Among these may be mentioned for example the substitution products, as for example of the carbonyls of iron or nickel, by $R_3N$, $R_3P$, $R_3As$, $R_3Sb$ or $R_3Bi$.

These compounds are used together with organic compounds which contain at least one halogen atom, as for example with compounds which contain a plurality of halogen atoms on one carbon atom, such as carbon tetrachloride, chloroform, trichloracetic acid, trichloracetonitrile, hexachlorethane, trichlor-bromomethane, trifluoriodomethane, methylene chloride or organic compounds which contain a teritary combined halogen atom as for example triphenylchlormethane or tertiary butyl bromide, as well as for example alpha-halogenhydrins, such as ethylene bromhydrin. In many cases also mono- or polyhalogenated especially saturated organic compounds, such as halogenated saturated aliphatic, cycloaliphatic or aromatic hydrocarbons are suitable, for example ethyl chloride, butyl bromide, monochlorcyclohexane, 1,4-dibromcyclohexane, monochlorbenzene or 1,2-dichlorbenzene; furthermore carboxylic ethyl chlorides or bromides may also be used, such as acid chlorides or saturated aliphatic, cycloaliphatic or aromatic mono- or polycarboxylic acids, for instance acetic acid chloride, propionic acid bromide, cyclohexylic acid chloride, benzoic acid chloride and terephthalic acid chloride.

The proportions in which the hydrocarbon compounds of the metals of the 4th main group or of the elements of the 5th main group and the organic compounds having removable halogen atoms can be varied within wide limits. It is possible to use them in equivalent amounts, but the hydrocarbon compound can be used in for example up to a 10-fold excess by weight, or even still more, for example up to 20 times the amount by weight. On the other hand the organic compound having removably combined halogen can be used in excess. Thus favorable results can be achieved with twice, or even with 5 to 10 times an excess of the said organic compound.

The reaction temperatures lie between about 50° and 250° C. or higher, in particular between about 100° and 200° C., and the pressure, depending on the ethylenically-unsaturated compound and the temperature used, lies at the vapour pressure of the telomerization medium, or higher, in particular at about 50 to 500 atmospheres.

The reaction can be carried out in the presence of inert diluents and solvents, as for example aliphatic, cycloaliphatic or aromatic hydrocarbons, if desired substituted, such as hexane, octane, gasoline fractions, cyclohexane, benzene or mixtures of such hydrocarbons as well as in aqueous emulsion or suspension, discontinuously or continuously.

After separating the telomers, which are usually solid, they are purified for example with organic liquids, as for example alcohols or ketones which are wholly or partly miscible with the indifferent polymerization medium. The telomer is then filtered off and washed again with organic liquids, as for example with methanol, ethanol, acetone, dioxane or tetrahydrofurane. To these organic liquids there may be added compounds serving for the removal of constituents of the catalyst, as for example oxalic acid, tartaric acid, hydrochloric acid or sulphuric acid, if desired with the addition of wetting agents. After repeated washing, completely colorless telomers are obtained with very low ash contents, as for example of 0.02 to 0.04 percent. The organic liquids may be used again after the distillation. The telomers can be used for the production of all compounds which are usually obtained from telomers. Thus for example they can be saponified in known manner with basic compounds to the omega hydroxycarboxylic acids. The corresponding omega-aminocarboxylic acids may also be obtained therefrom in known manner. The telomers which can be obtained according to this invention are of high molecular weight and in this respect differ from the telomers hitherto known, which are usually liquid. They can also be used for injection molding purposes and for the production of floor polishes.

The following examples will further illustrate this invention but the invention is not restricted to these examples. The parts are parts by weight.

Example 1

A mixture of 240 parts of cyclohexane, 3.3 parts of tetraethyl lead and 1.6 parts of carbon tetrachloride are slowly heated to 150° C. in a stirring autoclave under an initial ethylene pressure of 100 atmospheres (at 20° C.), the pressure there rising to 380 atmospheres. Within 2 hours the pressure falls to 230 atmospheres. It is then heated at 150° C. for 72 hours at this pressure. After releasing the pressure of the ethylene, a suspension of a solid telomer in cyclohexane is obtained. The white solid fraction is filtered off. The yield is 119 parts and the melting point is 96° C. The telomer may be used as an ingredient in floor polishes.

Example 2

In the same way as in Example 1, ethylene is telomerized with a mixture of 2 parts of tetraethyl lead and 1 part of tertiary butyl chloride, during the course of 2 hours. The reaction temperature is 150° C. and the ethylene pressure is kept at 200 atmospheres by continuously pressing in the same. The yield is 10 parts of a solid telomer having the melting point 116° C. and also about 10 parts of liquid telomers.

Example 3

10 parts of carbon tetrachloride and 5 parts of tin tetra-ethyl are added to 1000 parts of cyclohexane in a pressure-tight vessel. 150 atmospheres of ethylene are then forced in and the whole is heated to 150° C. A pressure of 420 atmospheres is reached at 127° C. This then begins to fall and at 150° C. after 24 hours has fallen back to 220 atmospheres. After cooling, the ethylene pressure is once more brought to 150 atmospheres. This time the pressure at 150° C. falls only to 245 atmospheres. After cooling, 83 parts of solid telomer of the melting point 115° to 120° C. are obtained. It is a suitable injection molding powder.

Example 4

A mixture of 8.25 parts of triphenylphosphine in 250 parts of cyclohexane and 1 part of carbon tetrachloride under an ethylene initial pressure of 80 atmospheres is slowly heated in a stirring autoclave. The absorption of ethylene is completed within 2 hours at 70° C. After raising the temperature to 100° C. and increasing the ethylene pressure to 190 atmospheres, no appreciable further absorption of ethylene takes place even after leaving for a long time under these reaction conditions. A suspension of solid telomer in cyclohexane is obtained. After filtering off the cyclohexane and drying, 23 parts of a telomer of the melting point 110° C. and also 14 parts of a product similar to petroleum jelly (softening temperature 55° C.) are obtained.

Example 5

A solution of 15.0 parts of triethyl-bismuth and 3.0 parts of carbon tetrachloride in 250 parts of cyclohexane is slowly heated to 150° C. in a stirring autoclave which has been rinsed out with nitrogen, under an initial pressure of 100 atmospheres of ethylene, the pressure thus first rising to 250 atmospheres, but then rapidly falling to 167 atmospheres. The solid reaction product is treated with dilute nitric acid. 38 parts of solid telomer of the melting point 75° to 85° C. are obtained.

Example 6

A mixture of 240 parts of cyclohexane, 10 parts of triphenylphosphine nickel carbonyl

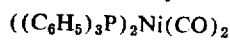

and 1 part of carbon tetrachloride in a stirring autoclave is slowly heated under an ethylene pressure of 50 atmospheres to 150° C., and left for 3 days at this temperature while maintaining the ethylene pressure at 150 atmospheres by continuously pressing in more ethylene. A suspension of white solid telomer is obtained which is filtered off and freed from cyclohexane. The yield is 70 parts and the melting point is 115° C.

Example 7

In an autoclave which has been rinsed with nitrogen, a mixture of 1 part of tetraethyl lead, 1 part of chloroform and 120 parts of cyclohexane is slowly heated to 150° C. under an initial pressure of ethylene of 81 atmospheres. After an initial slight increase, the pressure at once begins to fall. When the fall in pressure has ended, the pressure is released, the resultant solid product filtered off, washed with cyclohexane and then dried. 85 parts of pure white hard telomer of the melting point 105° to 110° C. are obtained.

If the same amount of methylene chloride be used instead of chloroform and the heating be to 180° C., 55 parts of telomer of the melting point 100° to 105° C. are obtained after the usual purification.

With the same amount of trichlorobromomethane instead of chloroform, 45 parts of telomer of the melting point 110° to 115° C. are obtained after heating to 120° C.

Example 8

1 part of tetraethyl lead and 1 part of hexachlorethane are added to 100 parts of freshly distilled styrene and heated under nitrogen to about 80° C. until the monomer has been completely converted into a solid clear product.

The hexachlorethane may be replaced by the same amount of trichloracetic acid with otherwise the same method of operation.

By using 2 parts of ethylene bromhydrin instead of the hexachlorethane and heating to 100° C., similar good results are obtained.

Example 9

A mixture of 100 parts of isobutylene, 2 parts of tetraethyl lead and 1 part of carbon tetrachloride is heated in an oxygen-free autoclave for 2 hours at 100° C. After cooling and releasing the pressure, 25 parts of a viscous telomer are obtained which for the most part boils above 250° C. at atmospheric pressure.

Example 10

In an autoclave which has been rinsed with nitrogen, a mixture of 1 part of tetraethyl lead, 2 parts of chloroform and 120 parts of cyclohexane is heated under an ethylene initial pressure of 80 atmospheres to 120° C. The telomer formed is worked up as usual. 75 parts are obtained, the melting point being 100° to 105° C.

Example 11

A mixture of 100 parts of butadiene, 2 parts of tetraethyl tin, 1 part of chloroform and 200 parts of cyclohexane is heated in an autoclave under nitrogen for 1 hour at 80° C. After cooling and evaporating the cyclohexane and the unconverted butadiene, about 70 parts of tough rubber-like telomer are obtained.

85 parts of solid telomer can be obtained in the same way from 100 parts of vinyl chloride.

Example 12

A mixture of 100 parts of distilled methacrylic acid methyl ester, 2 parts of finely powdered triphenylphosphine and 1 part of chloroform is slowly heated while excluding air and kept at 80° C. until all the monomer has been converted into a solid glass-clear telomer.

Example 13

3 parts of tribenzylphosphine and 1 part of chloroform are added to 100 parts of styrene and heated at 80° C. until the monomer has been completely converted. A solid hard telomer is obtained, likewise when heating is to 100° C. and the tribenzylphosphine is replaced by 2 parts of tri-normal-butylphosphine.

We claim:

1. The process for the production of telomers which comprises heating at 50–250° C. and at a pressure of 50–500 atmospheres a lower olefin and a lower molecular weight, organic monomeric compound containing 1–4 halogen groups, said monomeric compound being free from non-aromatic unsaturation, in the presence of a hydrocarbon compound of an element selected from the group consisting of germanium, tin, lead, nitrogen, phosphorus, arsenic, antimony, and bismuth at a weight ratio of said hydrocarbon compound to said organic monomeric compound between 20:1 and 1:2, respectively, until a solid telomer having a melting point in the range of 75–120° C. is produced.

2. The process of claim 1 wherein said organic monomeric compound is a halogen substituted lower alkane.

3. The process of claim 1 wherein said organic monomeric compound is a halogen addition monomeric compound.

4. A process for the production of telomers which comprises heating at 50–250° C. and at a pressure of 50–500 atmospheres ethylene and a lower molecular weight organic monomeric compound containing 1–4 halogen groups, said monomeric compound being free from non-aromatic unsaturation, in the presence of a hydrocarbon compound of an element selected from the group consisting of germanium, tin, lead, phosphorus, arsenic, antimony, and bismuth at a weight ratio of said hydrocarbon compound to said organic monomeric compound between 20:1 and 1:2, respectively, until a solid telomer having a melting point in the range of 75–120° C. is produced.

5. The process of claim 4 wherein said organic monomeric compound is a halogen substituted lower alkane.

6. The process of claim 4 wherein said organic monomeric compound is a chlorine substituted methane.

7. The process of claim 4 wherein said hydrocarbon compound of a metal is tetraethyl lead.

8. The process of claim 4 wherein said hydrocarbon compound of a metal is diethylene tin.

9. The process of claim 4 wherein said hydrocarbon compound of a metal is tetraethyl tin.

10. The process of claim 4 wherein said hydrocarbon compound of a metal is hexaphenyl distannan.

11. The process of claim 4 wherein said hydrocarbon compound of a metal is triphenylphosphine.

12. The process of claim 4 wherein said hydrocarbon compound of a metal is triethyl bismuth.

13. The process of claim 4 wherein said hydrocarbon compound of a metal is triphenylphosphine nickel carbonyl.

14. The process of claim 4 wherein said hydrocarbon compound of a metal is tribenzylphosphine.

15. The process of claim 4 wherein said hydrocarbon compound of a metal is triphenylarsine.

16. The process of claim 4 wherein said hydrocarbon compound of a metal is tri-n-butylphosphine.

References Cited in the file of this patent

UNITED STATES PATENTS

| | | |
|---|---|---|
| 2,402,137 | Hanford et al. | June 18, 1946 |
| 2,440,800 | Hanford et al. | May 4, 1948 |

OTHER REFERENCES

Schildknecht: Vinyl and Related Polymers, 1952, p. 540, John Wiley & Sons, Inc., New York.

UNITED STATES PATENT OFFICE
CERTIFICATE OF CORRECTION

Patent No. 3,019,215

January 30, 1962

Hugo Kroeper et al.

It is hereby certified that error appears in the above numbered patent requiring correction and that the said Letters Patent should read as corrected below.

Column 1, line 17, before "5th" insert -- the --; lines 34 and 35, for "exampe" read -- example --; line 39, for "cylcloaliphatic" read -- cycloaliphatic --; line 51, for "siutable" read -- suitable --; column 3, line 6, for "there" read -- thereby --.

Signed and sealed this 10th day of July 1962.

(SEAL)
Attest:

ERNEST W. SWIDER
Attesting Officer

DAVID L. LADD
Commissioner of Patents